(12) United States Patent
Zhou

(10) Patent No.: US 12,242,742 B1
(45) Date of Patent: Mar. 4, 2025

(54) STORING DATA IN A DIGITAL ASSISTANT

(71) Applicant: Beijing Zitiao Network Technology Co., Ltd., Beijing (CN)

(72) Inventor: Ren Zhou, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/632,632

(22) Filed: Apr. 11, 2024

(30) Foreign Application Priority Data

Oct. 27, 2023 (CN) .......................... 202311416770.X (51) Int. Cl.
*G06F 12/00* (2006.01)
*G06F 3/06* (2006.01)

(52) U.S. Cl.
CPC .......... *G06F 3/0631* (2013.01); *G06F 3/0607* (2013.01); *G06F 3/0652* (2013.01); *G06F 3/067* (2013.01)

(58) Field of Classification Search
CPC ............... G06F 16/176; G06F 21/6209; G06F 21/6218; G06F 2221/2141; G06F 2221/2147
See application file for complete search history.

(56) References Cited

U.S. PATENT DOCUMENTS

| | | |
|---|---|---|
| 9,130,832 B1 | 9/2015 | Boe et al. |
| 10,783,123 B1 | 9/2020 | Iacoletti et al. |
| 11,017,688 B1 | 5/2021 | Arazi |
| 2020/0251111 A1 | 8/2020 | Temkin et al. |
| 2023/0205904 A1 | 6/2023 | Hassan et al. |

FOREIGN PATENT DOCUMENTS

| | | |
|---|---|---|
| CN | 107924342 | 4/2018 |
| CN | 111258529 | 6/2020 |
| WO | WO 2021227907 | 11/2021 |
| WO | WO 2023011296 | 9/2023 |

OTHER PUBLICATIONS

International Search Report and Written Opinion in International Appln. No. PCT/CN2024/087339, mailed on Jun. 24, 2024, 9 pages (with English translation).

*Primary Examiner* — Yong J Choe
(74) *Attorney, Agent, or Firm* — Fish & Richardson P.C.

(57) ABSTRACT

Embodiments of the disclosure provides a method, apparatus, device, and storage medium for storing data in a digital assistant. The method includes: receiving a configuration request for one or more types of data to be stored in the digital assistant; in response to the configuration request, obtaining configuration information of respective types of data among the one or more types of data via one or more entries on a first user interface, the one or more entries corresponding to the one or more types of data, wherein the one or more types of data are to be extracted and stored, based on the configuration information in an interaction between the digital assistant and a user, for a subsequent interaction between the digital assistant and the user; and creating the digital assistant based at least on the configuration information.

20 Claims, 10 Drawing Sheets

STORING DATA IN A DIGITAL ASSISTANT

CROSS-REFERENCE TO RELATED APPLICATIONS

The present application claims priority to Chinese Patent Application No. 202311416770.X filed on Oct. 27, 2023, and entitled "Method, apparatus, device and medium for storing data", the entirety of which is incorporated here by reference.

TECHNICAL FIELD

Example embodiments of the present disclosure generally relate to the field of computers, and more particularly to storing data in a digital assistant.

BACKGROUND

Digital assistants are provided to assist users in various task processing needs in different applications and scenarios. Digital assistants usually have intelligent conversation and task processing capabilities. During the interaction with a digital assistant, a user inputs an interactive message, and the digital assistant provides a response message in response to the user input. Typically, digital assistants can enable users to input questions in a natural language and perform tasks and provide replies based on the understanding of natural language input and logical reasoning capabilities of the digital assistants. Digital assistant interaction has become a useful tool that people love and rely on because of their flexibility and convenience.

SUMMARY

In a first aspect of the present disclosure, a method of storing data in a digital assistant is provided. The method includes: receiving a configuration request for one or more types of data to be stored in the digital assistant; in response to the configuration request, obtaining configuration information of respective types of data among the one or more types of data via one or more entries on a first user interface, the one or more entries corresponding to the one or more types of data, wherein the one or more types of data are to be extracted and stored based on the configuration information in an interaction between the digital assistant and a user, for a subsequent interaction between the digital assistant and the user; and creating the digital assistant based at least on the configuration information.

In a second aspect of the present disclosure, a method of storing data in a digital assistant is provided. The method includes: receiving, in a second user interface, user input for the digital assistant; extracting the one or more types of data from the user input based on configuration information of one or more types of data to be stored in the digital assistant; and storing the extracted one or more types of data for a subsequent interaction between the digital assistant and the user.

In a third aspect of the present disclosure, an apparatus for storing data in a digital assistant is provided. The apparatus includes: a request receiving module configured to receive a configuration request for one or more types of data to be stored in the digital assistant; an information obtaining module configured to, in response to the configuration request, obtain configuration information of respective types of data among the one or more types of data via one or more entries on a first user interface, the one or more entries corresponding to the one or more types of data, wherein the one or more types of data are to be extracted and stored based on the configuration information in an interaction between the digital assistant and a user, for a subsequent interaction between the digital assistant and the user; and an assistant creating module configured to create the digital assistant based at least on the configuration information.

In a fourth aspect of the present disclosure, an apparatus for storing data in a digital assistant is provided. The apparatus includes: an input receiving module configured to receive, in a second user interface, user input for the digital assistant; a data extraction module configured to extract the one or more types of data from the user input based on configuration information of one or more types of data to be stored in the digital assistant; and a data storage module configured to store the extracted one or more types of data for a subsequent interaction between the digital assistant and the user.

In a fifth aspect of the present disclosure, an electronic device is provided. The device includes at least one processing unit; and at least one memory, the at least one memory is coupled to the at least one processing unit and stores instructions for execution by at least one processing unit. The instructions cause the electronic device to perform operations to implement the method of the first aspect when executed by at least one processing unit.

In a sixth aspect of the present disclosure, there is provided a computer-readable storage medium. The medium stores a computer program that, when executed by one or more processors, causes the one or more processors to implement the method of the first aspect.

It should be understood that the contents described in this section are not intended to limit the key features or important features of the present disclosure, nor are they intended to limit the scope of the present disclosure. Other features of the present disclosure will become readily understood from the following description.

BRIEF DESCRIPTION OF THE DRAWINGS

In the following text, the above and other features, advantages, and aspects of each embodiment of the present disclosure will become more apparent in conjunction with the accompanying drawings and with reference to the following detailed description. In the drawings, the same or similar reference numerals indicate the same or similar elements, where.

DETAILED DESCRIPTION

Embodiments of the present disclosure will be described in more detail below with reference to the accompanying drawings. Although some embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for illustrative purposes and are not intended to limit the scope of protection of the present disclosure.

In the description of the embodiments of the present disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". Other explicit and implicit definitions may also be included in the following.

Unless expressly stated, performing a step "in response to A" does not mean that the step is performed immediately after "A", but may include one or more intermediate steps.

It is to be understood that data involved in the present technical solution (including but not limited to the data itself, the acquisition, use, storage or deletion of the data) should comply with requirements of corresponding laws and regulations and relevant rules.

It is to be understood that, before applying the technical solutions disclosed in various embodiments of the present disclosure, the relevant user should be informed of the type, scope of use, and use scenario of the personal information involved in the subject matter described herein in an appropriate manner in accordance with relevant laws and regulations, and user authorization should be obtained, wherein the relevant user may include any type of rights subject, such as individuals, enterprises, groups.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage medium that execute operations of the technical solutions of the subject matter described herein.

As an optional but non-limiting embodiment, in response to receiving an active request from the user, the way of sending the prompt information to the user may, for example, include a pop-up window, and the prompt information may be displayed in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the embodiments of the present disclosure. Other methods that satisfy relevant laws and regulations are also applicable to the embodiments of the present disclosure.

As used herein, the term "model" may learn the correlation relationship between corresponding inputs and outputs from training data, so that corresponding outputs may be generated for given inputs after training. The generation of the model may be based on machine learning technology. Deep learning is a machine learning algorithm that processes inputs and provides corresponding outputs by using a plurality of layers of processing units. Neural networks models are an example of deep learning-based models. In this specification, "model" may also be referred to as "machine learning model", "learning model", "machine learning network", or "learning network", and these terms are used interchangeably herein.

Digital assistants may serve as effective tools for people's work, study, and life. Typically, the development of digital assistants is similar to the development of general applications, requiring developers with programming skills to define the various capabilities of digital assistants by writing complex code and deploying them on appropriate operating platforms so that users may download, install, and use digital assistants.

With the diversification of application scenarios and the increasing availability of machine learning technology, the development of more digital assistants with different capabilities to support task processing in various subdivisions or meet the personalized needs of different users is expected. However, limitations in programming capabilities of potential creator users as well as a limited understanding of the underlying implementation logic of digital assistants, prevent users from freely and conveniently creating different digital assistants. This specification describes technologies that provide a more convenient and flexible way to create the digital assistants, allowing more users to configure the digital assistant they want.

According to some embodiments of the present disclosure, an improved solution for creating a digital assistant is provided. According to this solution, in the process of creating the digital assistant, a processing component and a user interface defining the data type to be stored are provided. On the user interface, configuration information of the respective types of data is input and displayed via entries corresponding to one or more types of data to be stored. Based on the configuration information, the respective types of data are extracted and stored during an interaction between the digital assistant and the user for use during a subsequent interaction between the digital assistant and the user.

Therefore, by providing a modular, simple and free input digital assistant creation solution, users may easily and quickly define the data type to be stored without requiring coding skills, which improves the creation efficiency of digital assistants.

Figure 1:
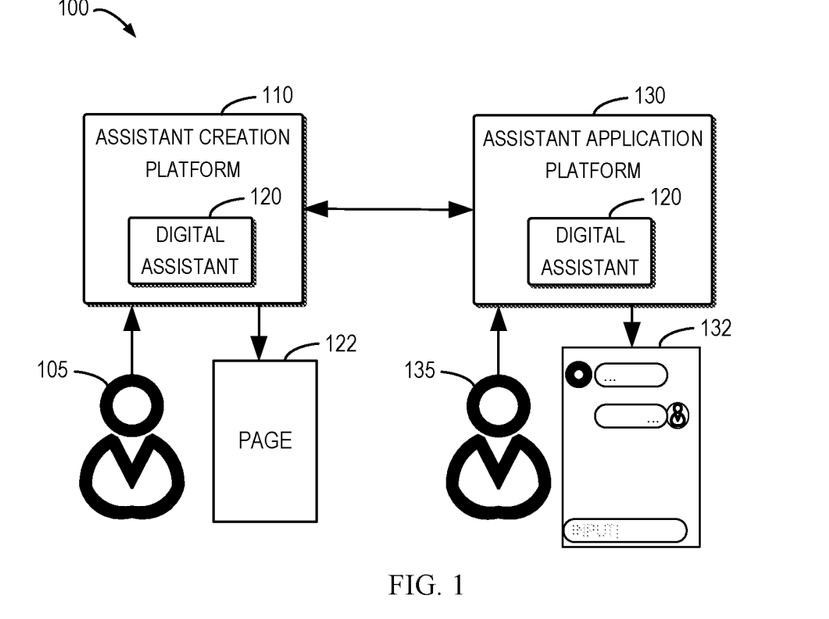
FIG. 1 illustrates a schematic diagram of an example environment.

FIG. 1 illustrates a block diagram of an example environment 100 in which embodiments of the present disclosure may be implemented. The environment 100 involves an assistant creation platform 110 and an assistant application platform 130.

As shown in FIG. 1, the assistant creation platform 110 may provide creation and publishing environments of the digital assistant for a user 105. In some embodiments, the assistant creation platform 110 may be a low-code platform that provides a collection of tools for digital assistant creation. The assistant creation platform 110 may support visual development of digital assistants, allowing developers to skip the manual coding process, accelerating the development cycle of applications and reducing the cost. The assistant creation platform 110 may support any suitable platform for users to develop digital assistants and other types of applications, such as platforms based on application platform as a service (aPaaS). Such a platform may enable users to efficiently develop applications and achieve application creation, application functionality adjustment, and other operations.

The assistant creation platform 110 may be deployed locally on a terminal device of the user 105 and/or may be supported by a remote server. For example, the terminal device of the user 105 may run a client (e.g., an application) in communication with the assistant creation platform 110, which may support the user's interaction with the assistant creation platform 110. In a case where the assistant creation platform 110 runs locally on the user's terminal device, the user 105 may directly use the client to interact with the local assistant creation platform 110. In a case where the assistant creation platform 110 runs on a server device, the server device may provide services to the client, e.g., to a particular application, running on the terminal device based on the communication connection with the terminal device. The assistant creation platform 110 may present a corresponding page 122 to the user 105 based on the operation of the user 105 to output and/or receive information to and/or from the user 105.

In some embodiments, the assistant creation platform 110 may be associated with a corresponding database, which stores data or information required for the digital assistant creation process supported by the assistant creation platform 110. For example, the database may store codes and descriptive information corresponding to various functional modules that constitute the digital assistant. The assistant creation platform 110 may also perform operations such as calling, adding, deleting, updating, etc. on the functional modules in the database. The database may also store operations that may be performed on different functional modules. In an example, in a scenario where an application is to be created, the assistant creation platform 110 may call corresponding functional blocks from the database to build the application.

In some embodiments of the present disclosure, the user 105 may create a digital assistant 120 on the assistant creation platform 110 as needed and publish the digital assistant 120. The digital assistant 120 may be published to any suitable assistant application platform 130 as long as the assistant application platform 130 may support the running of the digital assistant 120. After publication, the digital assistant 120 may be used for conversational interaction with a user 135. The client of the assistant application platform 130 may present an interaction window 132 of the digital assistant 120 in the client interface, such as a session window. The digital assistant 120, as an intelligent assistant, has intelligent conversation and information processing capabilities. The user 140 may input a session message in the session window, and the digital assistant 120 may determine a response message based on the created configuration information and present the response message to the user in the interaction window 132. In some embodiments, depending on the configuration of the digital assistant 120, the interaction message with the digital assistant 120 may include messages in various formats, such as text messages (e.g., natural language text), voice messages, image messages, video messages, and so on.

The assistant creation platform 110 and/or the assistant application platform 130 may run on an appropriate electronic device. The electronic device may be any suitable type of computing-capable device, including a terminal device or a server device. The terminal device may be any suitable type of mobile terminal, stationary terminal, or portable terminal, including mobile phones, desktop computers, laptop computers, notebook computers, netbook computers, tablet computers, media computers, multimedia tablets, personal communication system (PCS) devices, personal navigation devices, personal digital assistants (PDAs), audio/video player, digital cameras/camcorders, positioning devices, television receivers, radio broadcast receivers, electronic book devices, gaming devices, or any combination of the foregoing, including accessories and peripherals of these devices, or any combination thereof. Server devices may include, for example, computing systems/servers, such as mainframes, edge computing nodes, computing devices in cloud environments, and the like. In some embodiments, the assistant creation platform 110 and/or the assistant application platform 130 may be implemented based on cloud services.

It should be understood that the structure and functionality of environment 100 are described for illustrative purposes only, without implying any limitation on the scope of the present disclosure. For example, although FIG. 1 shows a single user interacting with the assistant creation platform 110 and a single user interacting with the assistant application platform 130, multiple users can actually access the assistant creation platform 110 to each create a digital assistant, and each digital assistant can be used to interact with multiple users.

Some example embodiments of the present disclosure will be described in detail below with reference to the accompanying drawings. It should be understood that the pages shown in the drawings are merely examples and various page designs may actually exist. The various graphic elements in the page may have different arrangements and visual representations, one or more of which may be omitted or replaced, and one or more other elements may also exist. Embodiments of the present disclosure are not limited in this aspect.

The digital assistant creation process described in the present disclosure may be implemented on the assistant creation platform, a terminal device which installs the assistant creation platform and/or a server corresponding to the assistant creation platform. In some examples below, for the sake of discussion, description is made from the perspective of the assistant creation platform, such as the assistant creation platform 110 shown in FIG. 1. The pages displayed by the assistant creation platform 110 may be displayed via the terminal device of the user 105, and user input may be received via the terminal device of the user 105. The user 105 who creates the digital assistant is sometimes referred to as an assistant creator, an assistant developer, and the like herein.

Figure 2:
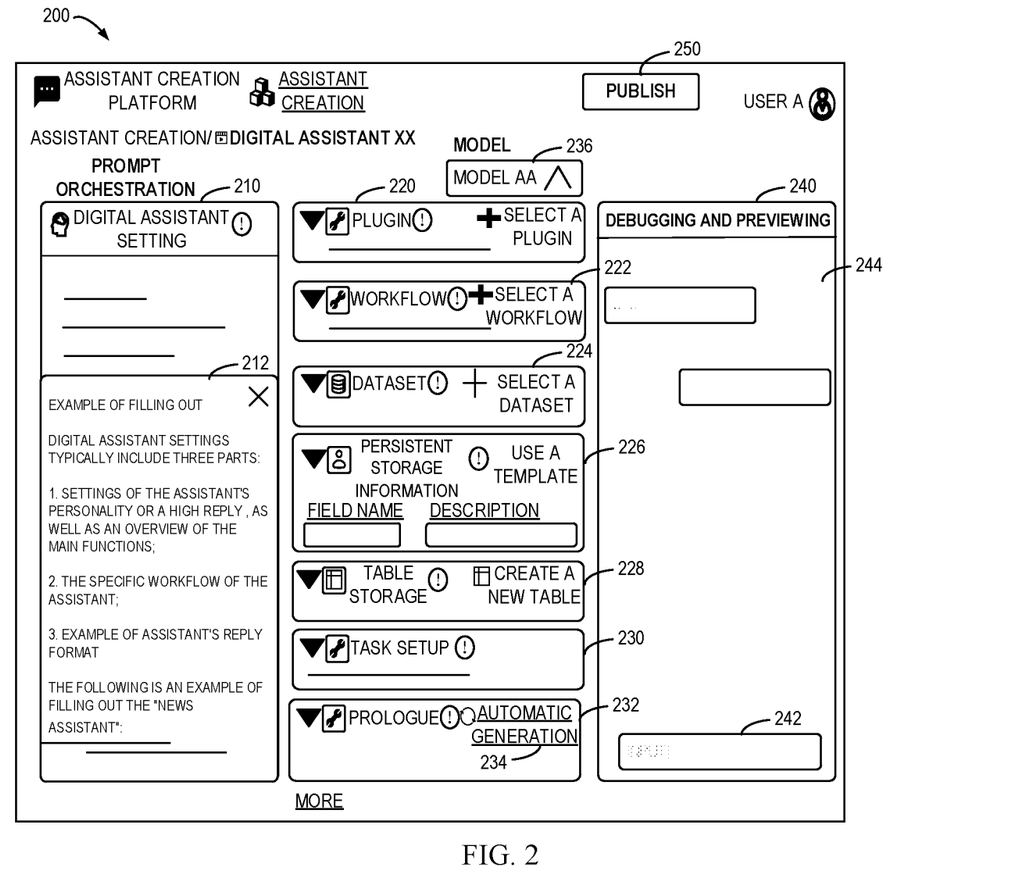
FIG. 2 illustrates an example of a page for creating a digital assistant.

The user 105 may initiate a creation request to the assistant creation platform 110 as needed. In response to receiving the creation request, the assistant creation platform 110 presents a page for creating the digital assistant. On this page, the user 105 may configure the digital assistant to be created (for example, the digital assistant 120 shown in FIG. 1). In contrast to techniques for creating a digital assistant by writing code, in embodiments of the present disclosure, the page for creating the digital assistant is designed to include at least one configuration area for receiving configuration information for the digital assistant, and each of the at least one configuration area is defined to receive a class of configuration information required for constructing the digital assistant. FIG. 2 illustrates an example of a page 200 for creating the digital assistant 120 in accordance with some embodiments of the present disclosure.

Specifically, the page includes at least a first configuration area for receiving settings information input in a natural language. For example, the page 200 in FIG. 2 provides a configuration area 210, which includes an input box for receiving settings information input by a user in a natural language.

The received settings information, as part of the configuration information of the digital assistant 120, will be used for generating a prompt input of the model. The response of the digital assistant 120 to the user is determined based on the output of the model. That is to say, the digital assistant 120 to be created will use the model to understand a user input and provide responses to the user based on the output of the model. The model used by the digital assistant 120 may run locally on the assistant creation platform 110 or on a remote server. In some embodiments, the model may be a machine learning model, a deep learning model, a learning model, neural networks, etc. In some embodiments, the model may be based on a language model (LM). The language model may have question answering capability by learning from a large amount of corpus. The model may also be based on other appropriate models.

During the creation process, a specific configuration area is provided for a user to provide settings information, and the configuration of settings information may be completed through natural language inputs by the user. Therefore, users may easily constrain the output of the model and configure diverse digital assistants.

In addition, the page also includes a second configuration area for receiving configurations for at least one processing component. The processing component information indicates at least one processing component available for use by the digital assistant 120 when processing user requests. Each processing component may be understood as a tool that the digital assistant 120 can call when processing user requests, and each processing component may perform corresponding functions or services. The types of processing components may be very diverse, and may be selected, configured, or modified by the user 105 from existing processing components, or may allow the user 105 to customize one or more processing components. As shown in FIG. 2, the configuration area for receiving configurations for at least one processing component in the page 200 includes configuration areas 220, 222, 224, 226, 228, 230.

These processing components can be called by the model. After being configured (added), the descriptions corresponding to these processing components (including but not limited to functions, input/output, usage conditions, etc.) will be provided to the model in the form of a prompt, thereby indicating to the model that the corresponding capabilities of the components can be called. During the interaction with the user, the model can be used to analyze and judge whether to call the corresponding processing components (or tools) and capabilities. Examples of processing components include but are not limited to plugins, functions, APIs, etc.

By understanding user requests with the help of models and settings information and implementing user requests with the help of processing components, the digital assistant 120 will have a function for interacting with users and responding to user requests. The page used to create the digital assistant is templated to provide various configuration areas for receiving configuration information of the digital assistant 120, and the user 105 may complete the customization of the digital assistant 120 without the need for complex configuration and coding.

In some embodiments, the page for creating the digital assistant may also include a third configuration area for receiving guidance information. In the example page 200 of FIG. 2, an area 232 for receiving guidance information is provided. The guidance information is displayed directly to the user 135 when the user 135 triggers an interaction with the digital assistant 120. In some embodiments, the guidance information includes at least one of the following: description information for the digital assistant 120 and at least one recommended question for the digital assistant 120. The description information for the digital assistant 120 may enable the user 135 to understand the characteristics of the digital assistant 120, the functions that can be achieved, etc. The recommended question for the digital assistant 120 may inspire the user 135 to initiate interaction with the digital assistant 120, or directly select the recommended question to interact with the digital assistant 120.

In some embodiments, the guidance information may be automatically generated. An information generation control may be provided in the page, for example, the information generation control may be provided at a position associated with the third configuration area. In the example of FIG. 2, the information generation control 234 may be provided near the area 232. Because the description information of the digital assistant 120 and/or at least one recommended question to the digital assistant 120 may be derived from the settings information, in some embodiments, in the process of creating the digital assistant 120, in response to detecting a triggering operation on the information generation control associated with the third configuration area, candidate guidance information is generated based at least on the settings information received in the first configuration area. The candidate guidance information is displayed in the third configuration area. In this way, the user 105 may determine whether to use the candidate guide information, modify or replace the candidate guide information and the like as needed, to obtain the final desired guidance information.

As mentioned above, the digital assistant 120 may understand user requests and determine responses to users with the help of models. In some embodiments, the model used by the digital assistant 120 may be default and does not require the creator to configure it. In some embodiments, during the creation of the digital assistant 120, the creator may be allowed to select the model to be used. A fourth configuration area may be provided on the page used to create the digital assistant for receiving a selection of the model. The selected model is called to determine the response to the user at the digital assistant 120. As shown in FIG. 2, the page 200 also includes an area 236 for configuring the model, in which the user 105 may be allowed to select the model to be used.

The configurable processing components in the process of creating a digital assistant have been discussed above. In specific applications, the assistant creation platform may provide more, fewer, or different configurations of processing components as needed for the creator of the digital assistant to choose or configure.

In some embodiments, in order to allow the user 105 who creates the digital assistant to easily test the performance of the created digital assistant 120 during the creation process, a debugging area for the digital assistant, such as a debugging area 240 shown in FIG. 2, may also be provided on the page. The debugging area 240 includes an input area 242 for receiving a debugging request for the digital assistant 120, and a presentation area 244 for providing a debugging result for the debugging request (and providing the received debugging request). The debugging area 240 may be configured in the form of an interactive window, to simulate the interactive interface viewed by the interactive user of the digital assistant 120.

During the debugging process, the debugging results displayed in the debugging area 240 may be determined based on the received debugging request and the current configuration information for the digital assistant 120 on the page 200. The user 105 may decide whether the actual operating results of the digital assistant 120 meet expectations based on the debugging results, and determine whether to continue modifying the configuration information, or publish the digital assistant. In some embodiments, for each debugging request, in addition to providing the debugging results, the digital assistant 120 may also provide the underlying operating process for determining the debugging results, such as calling the model, the thinking process of the model, one or more plugins used, etc. This can facilitate the user 105 to more quickly determine whether the currently configured digital assistant meets expectations.

In some embodiments, the second configuration area may include an area for configuring persistent storage information, such as the area 226 shown in FIG. 2. Typically, during the interaction between the user and the digital assistant, due to limitation such as model input length, the digital assistant may extract limited contextual information from historical interactions to understand user input. However, for users interacting with the digital assistant, they may expect the digital assistant to maintain long-term memory of certain information, so as to continuously provide more targeted responses. If the digital assistant needs to repeatedly inquire about this information during the interaction with the digital assistant, it will cause a decrease in the user's experience. Therefore, according to the embodiments of the present disclosure, developers of the digital assistant are allowed to predefine one or more types of data to be stored persistently by the digital assistant 120. With the configuration, the one or more defined types of data will be automatically extracted and stored during the interaction between the digital assistant 120 and the user for use in a subsequent interaction. If the user updates a certain type of data during the interaction, the previously stored data will be overwritten or updated. The defined data will be persistently stored for specific users interacting with the digital assistant 120. In this way, from the perspective of the interactive user of the digital assistant 120, the digital assistant 120 is able to remember or recall certain key information, thus providing a good interactive experience for the user.

Figure 3A:
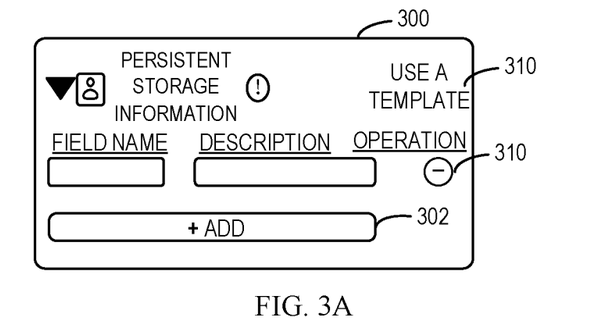
FIGS. 3A and 3B illustrate example user interfaces for configuring a data type to be stored.

In some embodiments, a configuration request for one or more types of data to be stored in the digital assistant 120 may be received in the area 226 of the page 200. In some embodiments, the configuration request may include a request to add another data type to be stored. For example, as shown in FIG. 3A, a control 302 for adding an additional data type, or adding additional data type entries of the same or different data type, to be stored is displayed in a user interface 300, and a predetermined operation (such as a click operation, a long-press operation, and so on) on the control 302 is received as the request to add the data type to be stored. The user interface 300 may be part of the interactive interface (also referred to as the "first user interface") viewed by the user 105 as the creator of the digital assistant 120.

Figure 3B:
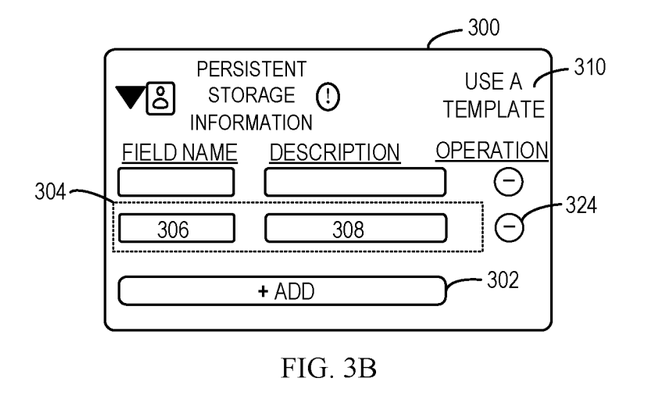

In some embodiments, in response to receiving the configuration request, as shown in FIG. 3B, an entry 304 corresponding to a newly added data type is displayed on the user interface 300. Configuration information of respective types of data may be obtained via the entry 304. For example, data configuration information input by the user in the entry 304 may be received. The configuration information may include a definition of the data. For example, as shown in FIG. 3B, the entry 304 includes a field name 306 and a description 308. Correspondingly, the user 105 may add, in the entry 304, a field name and a description of the data to be stored. Thus, the user may be allowed to configure one or more types of data to be stored in a manner of a key-value pair. The digital assistant 120 is created based at least on the configuration information. By defining the information to be persistently stored, after the created digital assistant 120 is published for the interaction with the user 135, the corresponding information input by the user 135 will be stored for a long time, e.g., beyond a current user interaction session with the digital assistant, and provided to the digital assistant 120 as an interaction context for the subsequent interaction.

For respective data types of respective entries, some default values may be predetermined during the creation of the digital assistant. During the interaction between the model and the user, the user may be initially replied based on the default values. As the interaction with the user continues, the default values may be continuously updated based on the information obtained from the interaction.

Figure 3C:
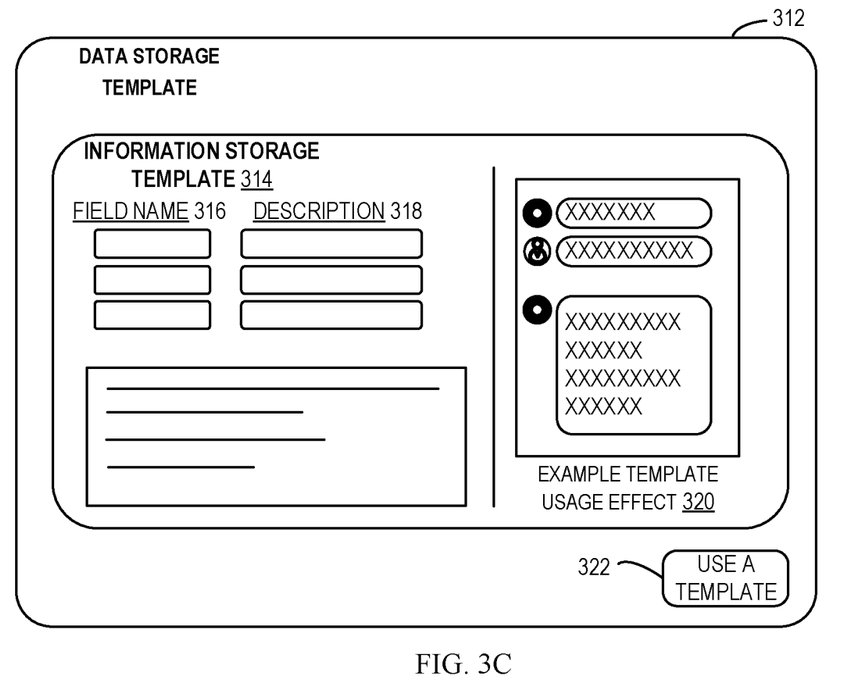
FIG. 3C illustrates an example display card of a data storage template.

In some embodiments, a data storage template may be used to further simplify the user operation, to improve the configuration efficiency of the data type to be stored. In these embodiments, the configuration request for one or more types of data to be stored includes a request to use the data storage template. As shown in FIG. 3A, a control 310 for activating the data storage template is displayed in the user interface 300. In response to receiving a predetermined operation on the control 310, a display card 312 of the data storage template is displayed, as shown in FIG. 3C. A predefined data storage template 314 is displayed on the display card 312, which includes a field name 316 and a description 318 of predefined types of data, and an example template usage effect 320 is displayed. In some embodiments, as shown in FIG. 3C, a control 322 for enabling the data storage template is further displayed in the display card 312. In this example, a predetermined operation on the control 322 displayed in the display card 312 is received as a request to use the data storage template. After the user 105 requests the use of the data storage template, corresponding entries may be added to the user interface 300 in FIG. 3A for displaying the field name 316 and the description 318 of the predefined type of data included in the data storage template 314.

In some embodiments, the user 105 may request to delete one or more entries 304 displayed in the user interface 300. As shown in FIG. 3B, a control 324 for deleting the entry 304 is displayed on the user interface 300. In response to receiving the predetermined operation on the control 324, the corresponding entry 304 may be deleted.

It should be understood that the form and content of the configuration request and the configuration information described above are only examples and not limitations. The assistant creation platform 110 may receive the request and the configuration information for the newly added data type made by the user 105 in any other way, such as receiving the request and the configuration information for the newly added data type input by the user via a microphone, a physical operation control, and so on.

In some embodiments, the user 105 may access the stored data. A control for displaying the stored data may be displayed on the user interface. If the predetermined operation on the control for displaying the stored data is received, the assistant creation platform 110 may display, on the user interface, a display card of the stored data. The stored data herein is not visible to other users except the user. That is, the stored data of the user 105 may only be viewed by the user 105 and cannot be viewed by other users.

Figure 4:
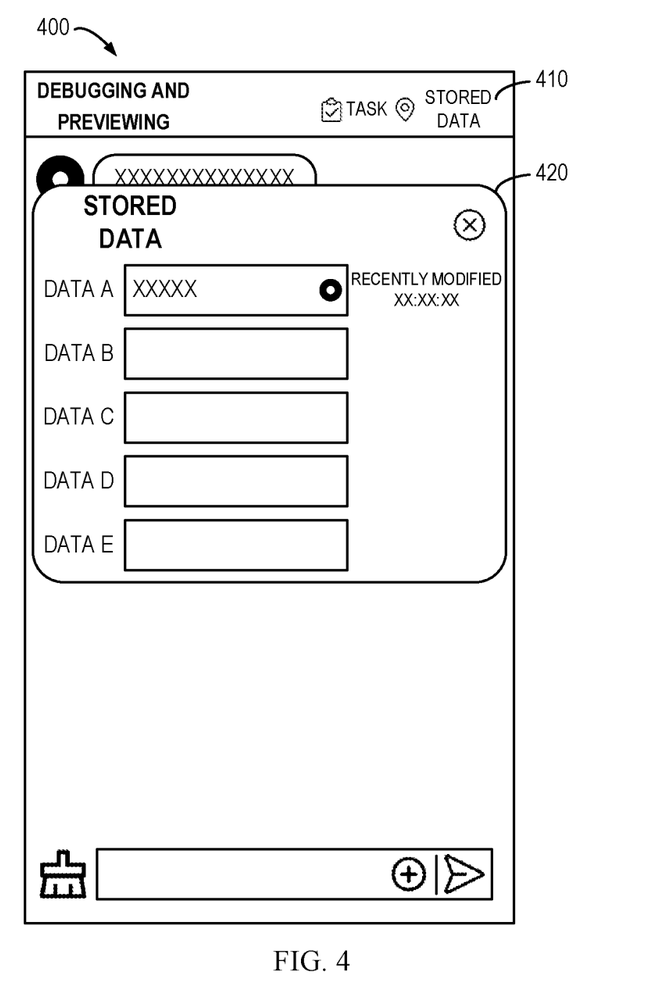
FIG. 4 illustrates an example user interface for showing stored data.

For example, as shown in FIG. 4, the assistant creation platform 110 may display an example user interface 400 for viewing stored data. A control 410 for displaying the stored data is displayed in the user interface shown in the example 400. The assistant creation platform 110 may, in response to detecting the predetermined operation on the control 410, display a display card 420 of the stored data in the example 400. At least one stored data may be displayed in the display card 420. In some embodiments, the display card 420 may further display the time when the user last modified the stored data (for example, information such as "recently modified XX: XX: XX" may be displayed).

Figure 5:
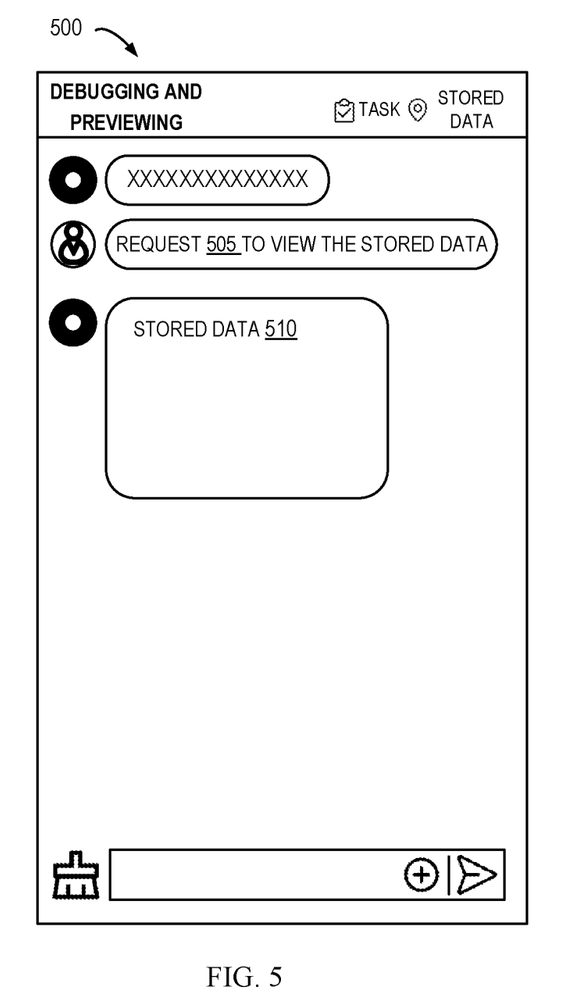
FIG. 5 illustrates an example user interface for viewing stored data.

In addition to triggering card display by operating the control, the user 105 may further view the stored data through a session message. For example, as shown in FIG. 5, the user 105 may input a request 505 to view the stored data in a user interface 500 of "Debugging and Previewing". In response to the request 505, stored data 510 is displayed in the user interface 500. Therefore, user interaction efficiency may be further improved and the user experience may be improved.

After the digital assistant 120 created based at least on the configuration data about the data type to be stored is published, the corresponding information input by the user 135 may be stored for a long time during the interaction between the digital assistant 120 and the user 135 for use during a subsequent interaction between the digital assistant 120 and the user 135.

In some embodiments, after receiving the user input from the digital assistant 120 in an interactive interface (also referred to as the "second user interface") viewed by the user 135 as the user of the digital assistant 120, one or more types of data are extracted and stored from the user input based on the configuration information of one or more types of data to be stored in the digital assistant 120. The stored data may be used as the interaction context for the subsequent interaction between the digital assistant 120 and the user 135, thereby improving the interactive experience of the user.

Figure 6:
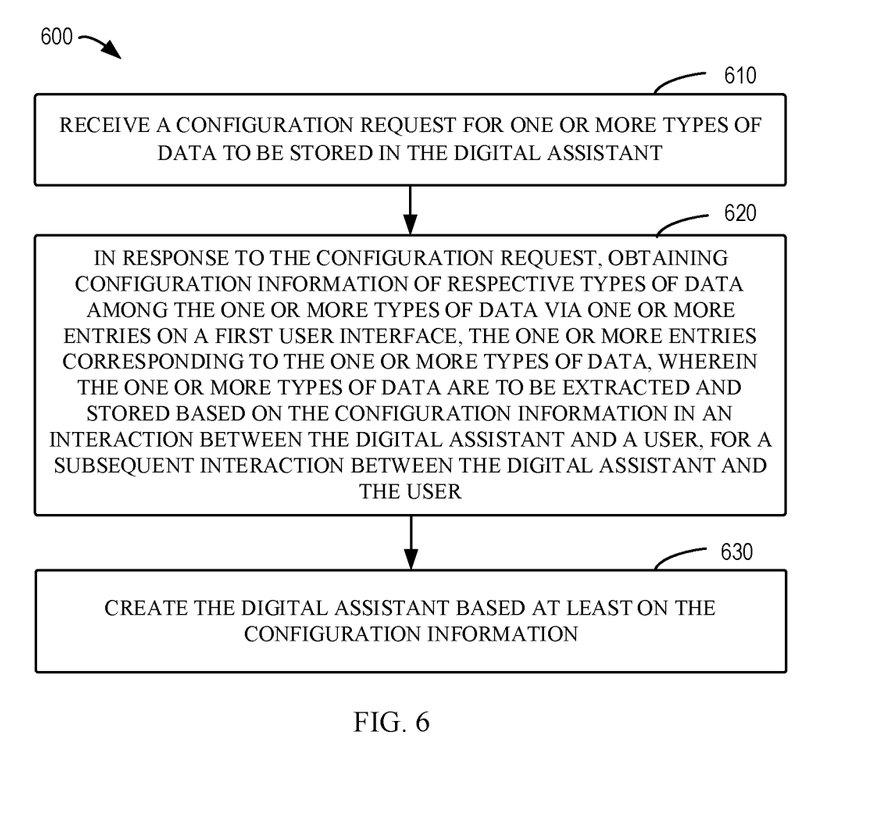
FIG. 6 illustrates a flowchart of an example process for storing data in a digital assistant.

FIG. 6 illustrates a flow chart of an example process 600 for storing data in a digital assistant according to some embodiments of the disclosure. The process 600 may be implemented, for example, at the assistant creation platform 110. In the following, the process 600 may be described with reference to FIG. 1.

At block 610, the assistant creation platform 110 receives a configuration request for one or more types of data to be stored in the digital assistant.

At block 620, the assistant creation platform 110, in response to the configuration request, obtains configuration information of respective types of data among the one or more types of data via one or more entries on a first user interface. The one or more entries correspond to the one or more types of data, the one or more types of data are to be extracted and stored, based on the configuration information in an interaction between the digital assistant and a user, for a subsequent interaction between the digital assistant and the user.

At block 630, the assistant creation platform 110 creates the digital assistant based at least on the configuration information.

In some embodiments, the configuration request comprises a request to increase a data type to be stored.

In some embodiments, receiving the configuration request comprises:
displaying, in the first user interface, a control for increasing the data type to be stored;
and receiving a predetermined operation on the control for increasing the data type to be stored, as the request to increase the data type to be stored.

In some embodiments, obtaining the configuration information comprises: in response to receiving the request to increase the data type to be stored, displaying, on the first user interface, the one or more entries corresponding to the one or more types of data; and receiving the configuration information of the respective types of data input in the one or more entries.

In some embodiments, the configuration request comprises a request to use a data storage template.

In some embodiments, the process 600 further comprises: displaying, in the first user interface, a control for activating the data storage template; in response to receiving a predetermined operation on the control for activating the data storage template, displaying, on the first user interface, a display card of the data storage template. Receiving the configuration request comprises: receiving a predetermined operation on a control for enabling the data storage template, as the request to use the data storage template, the control enabling the data storage template being displayed in the display card.

In some embodiments, the process 600 further comprises: displaying, in the first user interface, a control for deleting the one or more entries corresponding to the one or more types of data; and in response to receiving a predetermined operation on the control for deleting the one or more entries, deleting the one or more entries.

In some embodiments, the configuration information comprises definitions of the one or more types of data.

Figure 7:
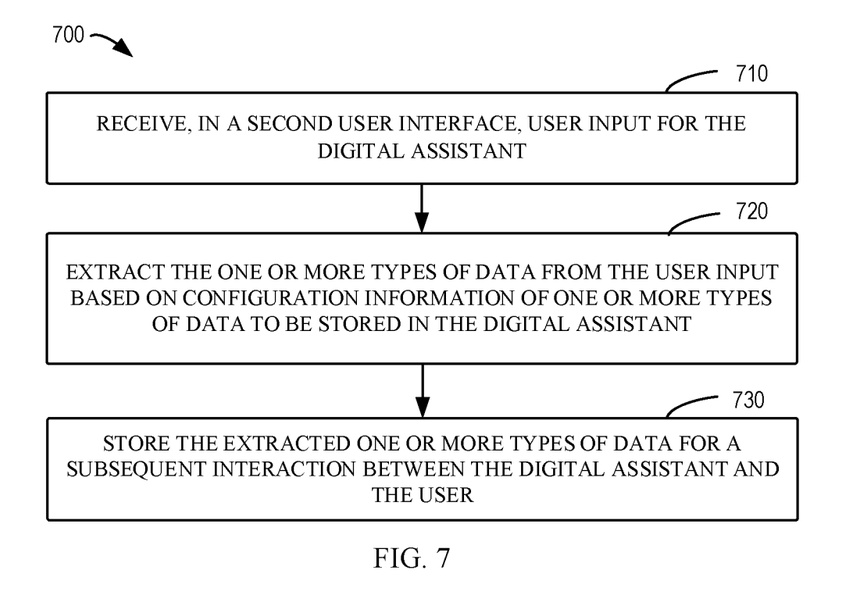
FIG. 7 illustrates a flowchart of an example process for storing data in a digital assistant.

FIG. 7 illustrates a flow chart of an example process 700 for storing data in a digital assistant according to some embodiments of the disclosure. The process 700 may be implemented at the assistant application platform 130. In the following, the process 700 may be described with reference to FIG. 1.

At block 710, the assistant application platform 130 receives, in a second user interface, user input for the digital assistant.

At block 720, the assistant application platform 130 extracts the one or more types of data from the user input based on configuration information of one or more types of data to be stored in the digital assistant.

At block 730, the assistant application platform 130 stores the extracted one or more types of data for a subsequent interaction between the digital assistant and the user.

Figure 8:
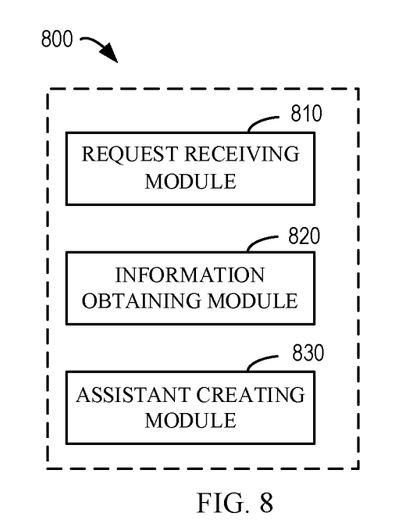
FIG. 8 illustrates a schematic structural block diagram of an example apparatus for storing data in a digital assistant.

FIG. 8 illustrates a schematic structural block diagram of an example apparatus 800 for storing data in a digital assistant in accordance with some embodiments of the disclosure. The apparatus 800 may be implemented or included, for example, in the assistant creation platform 110. Various modules/components in the apparatus 800 may be implemented by hardware, software, firmware, or any combination of them.

As shown in FIG. 8, the apparatus 800 includes a request receiving module 810 configured to receive a configuration request for one or more types of data to be stored in the digital assistant.

The apparatus 800 further includes an information obtaining module 820 configured to, in response to the configuration request, obtain configuration information of respective types of data among the one or more types of data via one or more entries on a first user interface. The one or more entries correspond to the one or more types of data. The one or more types of data are to be extracted and stored, based on the configuration information in an interaction between the digital assistant and a user, for a subsequent interaction between the digital assistant and the user.

The apparatus 800 further includes an assistant creating module 830 configured to create the digital assistant based at least on the configuration information.

In some embodiments, the configuration request comprises a request to increase a data type to be stored.

In some embodiments, the request receiving module 810 is configured to: display, in the first user interface, a control for increasing the number of data type entries to be stored; and receive a predetermined operation on the control for increasing the number of data type entries to be stored, as the request to increase the number of data type entries to be stored.

In some embodiments, the information obtaining module 820 is configured to: in response to receiving the request to increase the number of data type entries to be stored, display, on the first user interface, the one or more entries corresponding to the one or more types of data; and receive the configuration information of the respective types of data input in the one or more entries.

In some embodiments, the configuration request comprises a request to use a data storage template.

In some embodiments, the apparatus 800 further comprises: a first control displaying module configured to display, in the first user interface, a control for activating the data storage template; and a card displaying module configured to, in response to receiving a predetermined operation on the control for activating the data storage template, display, on the first user interface, a display card of the data storage template. The request receiving module 810 is further configured to: receive a predetermined operation on a control for enabling the data storage template, as the request to use the data storage template, the control enabling the data storage template being displayed in the display card.

In some embodiments, apparatus 800 further comprises: a second control displaying module configured to display, in the first user interface, a control for deleting one or more entries corresponding to the one or more types of data; and an entry deleting module configured to, in response to receiving a predetermined operation on the control for deleting one or more entries, delete the one or more entries corresponding to the control.

In some embodiments, the configuration information comprises definitions of the one or more types of data.

Figure 9:
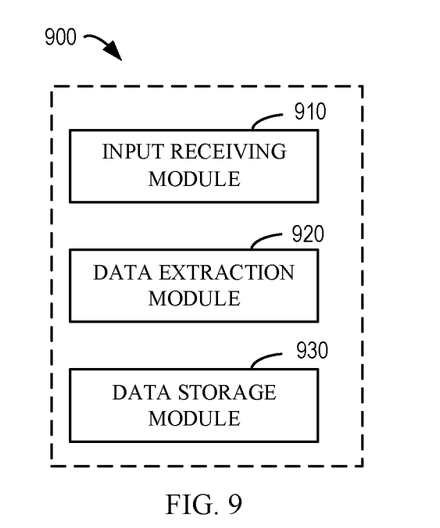
FIG. 9 illustrates a schematic structural block diagram of an example apparatus for storing data in a digital assistant.

FIG. 9 illustrates a schematic structural block diagram of an apparatus 900 for storing data in a digital assistant in accordance with some embodiments of the disclosure. The apparatus 900 may be implemented or included, for example, in the assistant application platform 130. Various modules/components in the apparatus 900 may be implemented by hardware, software, firmware, or any combination of them.

As shown in FIG. 9, the apparatus 900 includes an input receiving module 910 configured to receive, in a second user interface, user input for the digital assistant.

The apparatus 900 further includes a data extraction module 920 configured to extract the one or more types of data from the user input based on configuration information of one or more types of data to be stored in the digital assistant.

The apparatus 900 further includes a data storage module 930 configured to store the extracted one or more types of data for a subsequent interaction between the digital assistant and the user.

Figure 10:
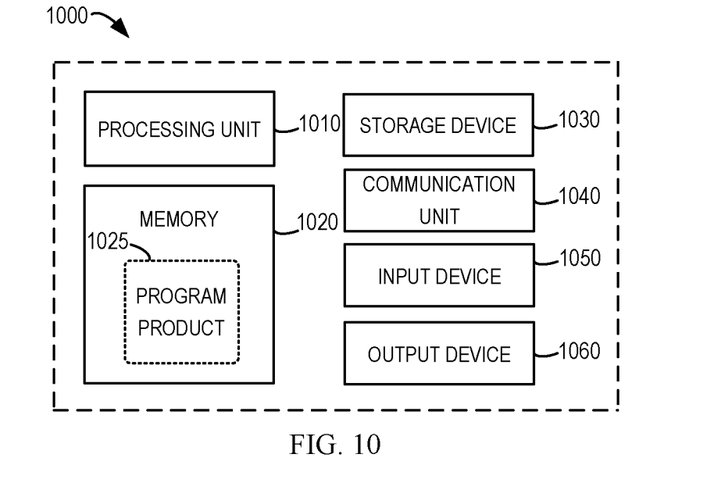
FIG. 10 illustrates a block diagram of an example electronic device.

FIG. 10 illustrates a block diagram of an electronic device 1000 in which one or more embodiments of the present disclosure may be implemented. It should be understood that the electronic device 1000 shown in FIG. 10 is merely an example and should not constitute any limitation on the functionality and scope of the embodiments described herein. The electronic device 1000 shown in FIG. 10 may include or be implemented as the assistant creation platform 110 of FIG. 1 or the apparatus 800 of FIG. 8, or may include or be implemented as the assistant application platform 130 of FIG. 1 or the apparatus 900 of FIG. 9.

As shown in FIG. 10, the electronic device 1000 is in the form of a general purpose electronic device. The components of the electronic device 1000 may include, but are not limited to, one or more processors or processing units 1010, a memory 1020, a storage device 1030, one or more communication units 1040, one or more input devices 1050, and one or more output devices 1060. The processing units 1010 may be an actual or virtual processor and is capable of performing various processes based on the programs stored in memory 1020. In a multiprocessor system, multiple processing units execute computer-executable instructions in parallel to enhance the parallel processing capability of the electronic device 1000.

The electronic device 1000 typically includes multiple computer storage media. Such media can be any suitable available media that is accessible to the electronic device 1000, including but not limited to volatile and non-volatile media, removable and non-removable media. The memory 1020 may be a volatile memory (such as a register, cache, a random access memory (RAM)), a non-volatile memory (such as a read-only memory (ROM), electrically erasable programmable read-only memory (EEPROM), a flash memory), or any combination thereof. The storage device 1030 may be removable or non-removable medium and may include machine-readable medium such as a flash drive, a disk, or any other medium that can be used to store information and/or data and can be accessed within electronic device 1000.

The electronic device 1000 may further include additional removable/non-removable, volatile/non-volatile storage medium. Although not shown in FIG. 10, a disk drive for reading from or writing to a removable, non-volatile disk (e.g., a "floppy disk") and an optical disk drive for reading from or writing to a removable, non-volatile optical disk may be provided. In these cases, each drive may be connected to a bus (not shown) by one or more data medium interfaces. The memory 1020 may include a computer program product 1025, which has one or more program modules configured to execute various methods or acts of various implementations of the present disclosure.

The communication unit 1040 communicates with a further electronic device through the communication medium. In addition, functionality of components in the electronic device 1000 may be implemented by a single computing cluster or multiple computing machines, which can communicate through a communication connection. Therefore, the electronic device 1000 may be operated in a networking environment using a logical connection with one or more other servers, a network personal computer (PC), or another network node.

The input device 1050 may be one or more input devices, such as a mouse, a keyboard, a trackball, etc. The output device 1060 may be one or more output devices, such as a display, a speaker, a printer, etc. The electronic device 1000 may also communicate with one or more external devices (not shown) through the communication unit 1040 as required. The external device, such as a storage device, a display device, etc., communicate with one or more devices that enable users to interact with the electronic device 1000, or communicate with any device (for example, a network card, a modem, etc.) that makes the electronic device 1000 communicate with one or more other computing devices. Such communication may be executed via an input/output (I/O) interface (not shown).

According to the example implementations of the present disclosure, a computer-readable storage medium is provided, on which a computer-executable instruction or computer program is stored, wherein the computer-executable instructions are executed by the processor to implement the method described above. According to the example implementations of the present disclosure, a computer program product is also provided. The computer program product is physically stored on a non-transient computer-readable medium and includes computer-executable instructions, which are executed by the processor to perform operations that implement the method described above.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to perform operations that implement various aspects of the functions/actions specified in one or more blocks in the flowchart and/or the block diagram.

The computer-readable program instructions may be loaded onto a computer, other programmable data processing apparatus, or other devices, so that a series of operational steps may be executed on a computer, other programmable data processing apparatus, or other devices, to generate a computer-implemented process, such that the instructions which execute on a computer, other programmable data processing apparatuses, or other devices are operable to implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the functionality involved. It should also be noted that each block in the block diagram and/or the flowchart, and combinations of blocks in the block diagram and/or the flowchart, may be implemented by a dedicated hardware-based system that executes the specified functions or acts, or by the combination of dedicated hardware and computer instructions.

Each implementation of the present disclosure has been described above. The above description provides a number of examples, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable others of ordinary skill in the art to understand the various implementations disclosed herein.

The invention claimed is:

1. A method of storing data in a digital assistant, comprising:
receiving a configuration request for one or more types of data to be stored in the digital assistant;
in response to the configuration request, obtaining configuration information of respective types of data among the one or more types of data via one or more entries on a first user interface, the one or more entries corresponding to the one or more types of data, wherein the configuration information comprises a field name and/or a description of the one or more types of data to be stored and wherein the one or more types of data are to be extracted and stored, based on the configuration information in an interaction between the digital assistant and a user, for a subsequent interaction between the digital assistant and the user; and
creating the digital assistant based at least on the configuration information.

2. The method of claim 1, wherein the configuration request comprises a request to increase a number of data type entries to be stored.

3. The method of claim 2, wherein receiving the configuration request comprises:
displaying, in the first user interface, a control for increasing the number of data type entries to be stored; and
receiving a predetermined operation on the control for increasing the number of data type entries to be stored, as the request to increase the number of data type entries to be stored.

4. The method of claim 3, wherein obtaining the configuration information comprises:
in response to receiving the request to increase the number of data type entries to be stored, displaying, on the first user interface, the one or more entries corresponding to the one or more types of data; and
receiving the configuration information of the respective types of data input in the one or more entries.

5. The method of claim 1, wherein the configuration request comprises a request to use a data storage template.

6. The method of claim 5, further comprising:
displaying, in the first user interface, a control for activating the data storage template;

in response to receiving a predetermined operation on the control for activating the data storage template, displaying, on the first user interface, a display card of the data storage template; and wherein receiving the configuration request comprises:
receiving a predetermined operation on a control for enabling the data storage template, as the request to use the data storage template, the control enabling the data storage template being displayed in the display card.

7. The method of claim 1, further comprising:
displaying, in the first user interface, a control for deleting one or more entries corresponding to the one or more types of data; and in response to receiving a predetermined operation on the control for deleting the one or more entries, deleting one or more entries corresponding to the control.

8. The method of claim 1, wherein the configuration information comprises definitions of the one or more types of data.

9. The method of claim 1, wherein default values are predetermined respective data types of respective entries.

10. The method of claim 9, wherein the default values are updated based on information obtained from the interaction.

11. A method for storing data in a digital assistant, comprising:
receiving, in a second user interface, user input for the digital assistant;
extracting one or more types of data from the user input based on configuration information of one or more types of data to be stored in the digital assistant, wherein the configuration information comprises a field name and/or a description of the one or more types of data to be stored; and
storing the extracted one or more types of data for a subsequent interaction between the digital assistant and a user.

12. An electronic device comprising:
at least one processing unit; and
at least one memory, the at least one memory being coupled to the at least one processing unit and storing instructions for execution by the at least one processing unit, the instructions, when executed by the at least one processing unit, causing the electronic device to perform operations comprising:
receiving a configuration request for one or more types of data to be stored in a digital assistant;
in response to the configuration request, obtaining configuration information of respective types of data among the one or more types of data via one or more entries on a first user interface, the one or more entries corresponding to the one or more types of data, wherein the configuration information comprises a field name and/or a description of the one or more types of data to be stored and wherein the one or more types of data are to be extracted and stored, based on the configuration information in an interaction between the digital assistant and a user, for a subsequent interaction between the digital assistant and the user; and
creating the digital assistant based at least on the configuration information.

13. The device of claim 12, wherein the configuration request comprises a request to increase a number of data type entries to be stored.

14. The device of claim 13, wherein receiving the configuration request comprises:
displaying, in the first user interface, a control for increasing the number of data type entries to be stored; and
receiving a predetermined operation on the control for increasing the number of data type entries to be stored, as the request to increase the number of data type entries to be stored.

15. The device of claim 14, wherein obtaining the configuration information comprises:
in response to receiving the request to increase the number of data type entries to be stored, displaying, on the first user interface, the one or more entries corresponding to the one or more types of data; and
receiving the configuration information of the respective types of data input in the one or more entries.

16. The device of claim 12, wherein the configuration request comprises a request to use a data storage template.

17. The device of claim 16, the operations further comprising:
displaying, in the first user interface, a control for activating the data storage template;
in response to receiving a predetermined operation on the control for activating the data storage template, displaying, on the first user interface, a display card of the data storage template; and
wherein receiving the configuration request comprises:
receiving a predetermined operation on a control for enabling the data storage template, as the request to use the data storage template, the control enabling the data storage template being displayed in the display card.

18. The device of claim 12, the operations further comprising:
displaying, in the first user interface, a control for deleting one or more entries corresponding to the one or more types of data; and
in response to receiving a predetermined operation on the control for deleting one or more entries, deleting the one or more entries corresponding to the control.

19. The device of claim 12, wherein the configuration information comprises definitions of the one or more types of data.

20. The device of claim 12, wherein default values are predetermined respective data types of respective entries.

* * * * *